Aug. 17, 1954

H. W. FAEBER ET AL 2,686,552

APPARATUS FOR BONDING LAMINAE
OF LAMINATED PRINTING PLATES

Filed Feb. 15, 1950

INVENTORS
HARRY W. FAEBER &
GEORGE N. SANDOR
BY
Campbell, Brumbaugh, Free & Graves
Their ATTORNEYS

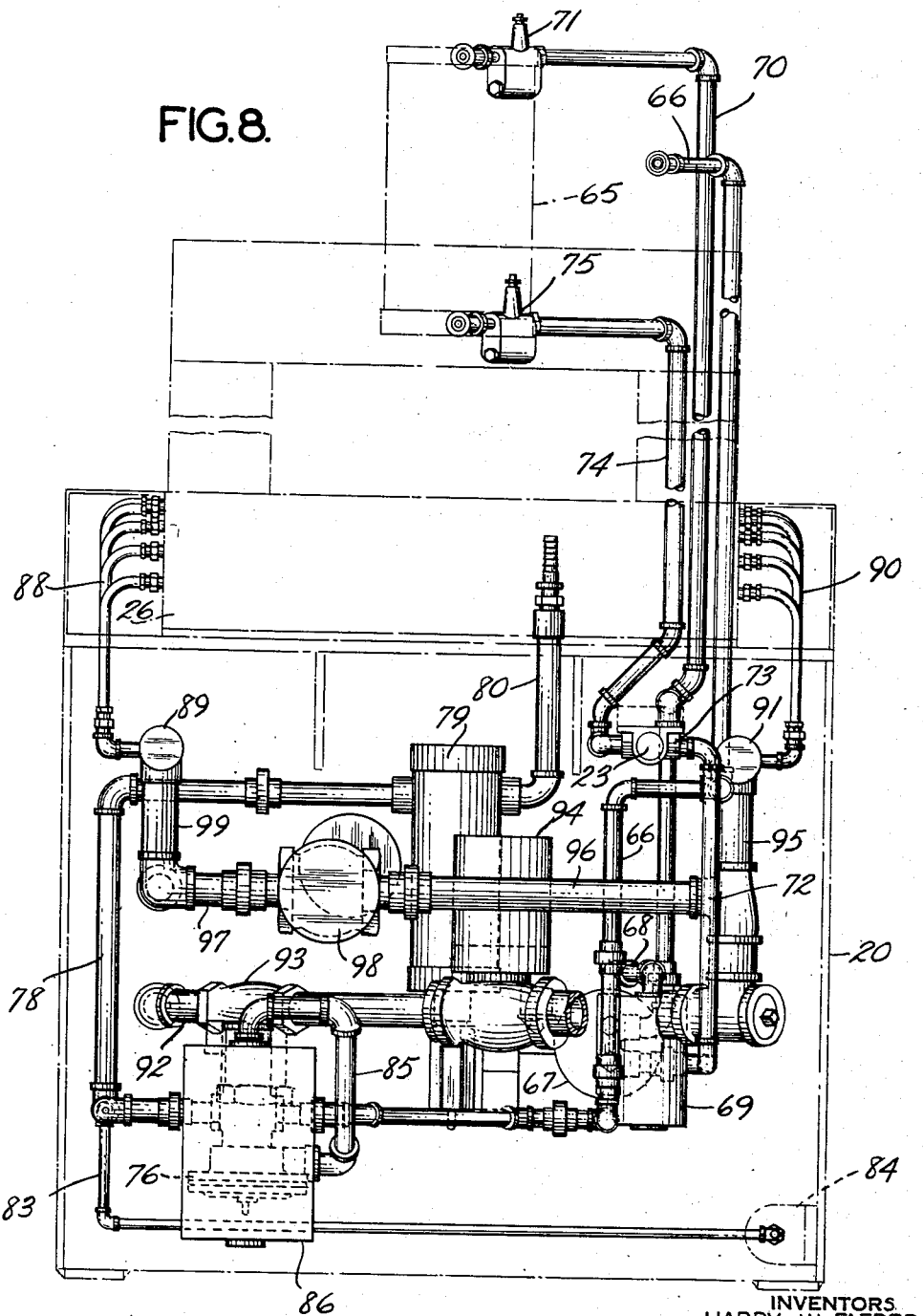

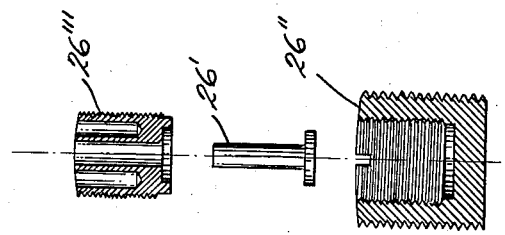
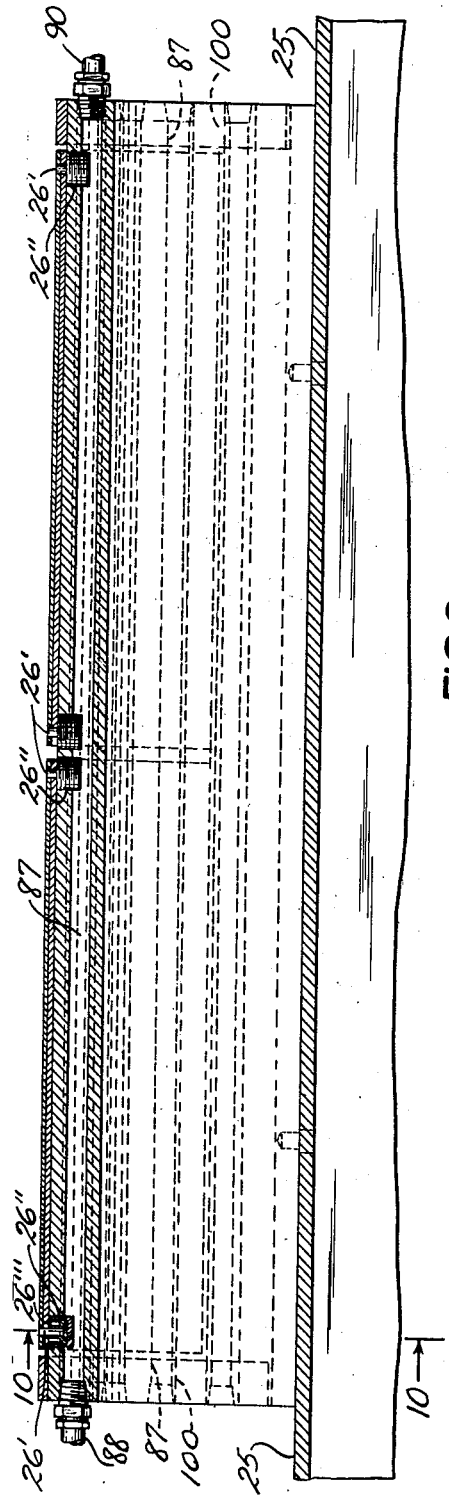
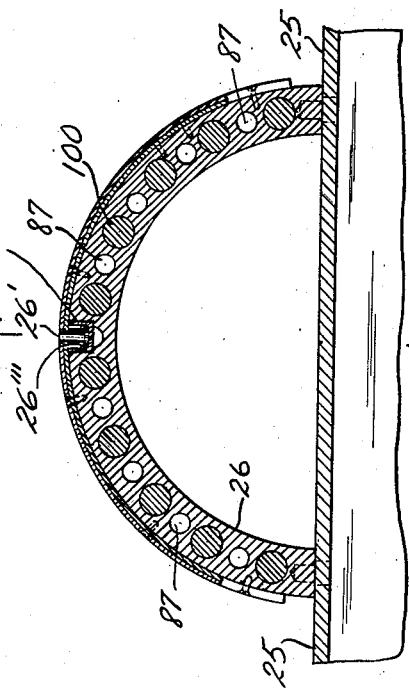

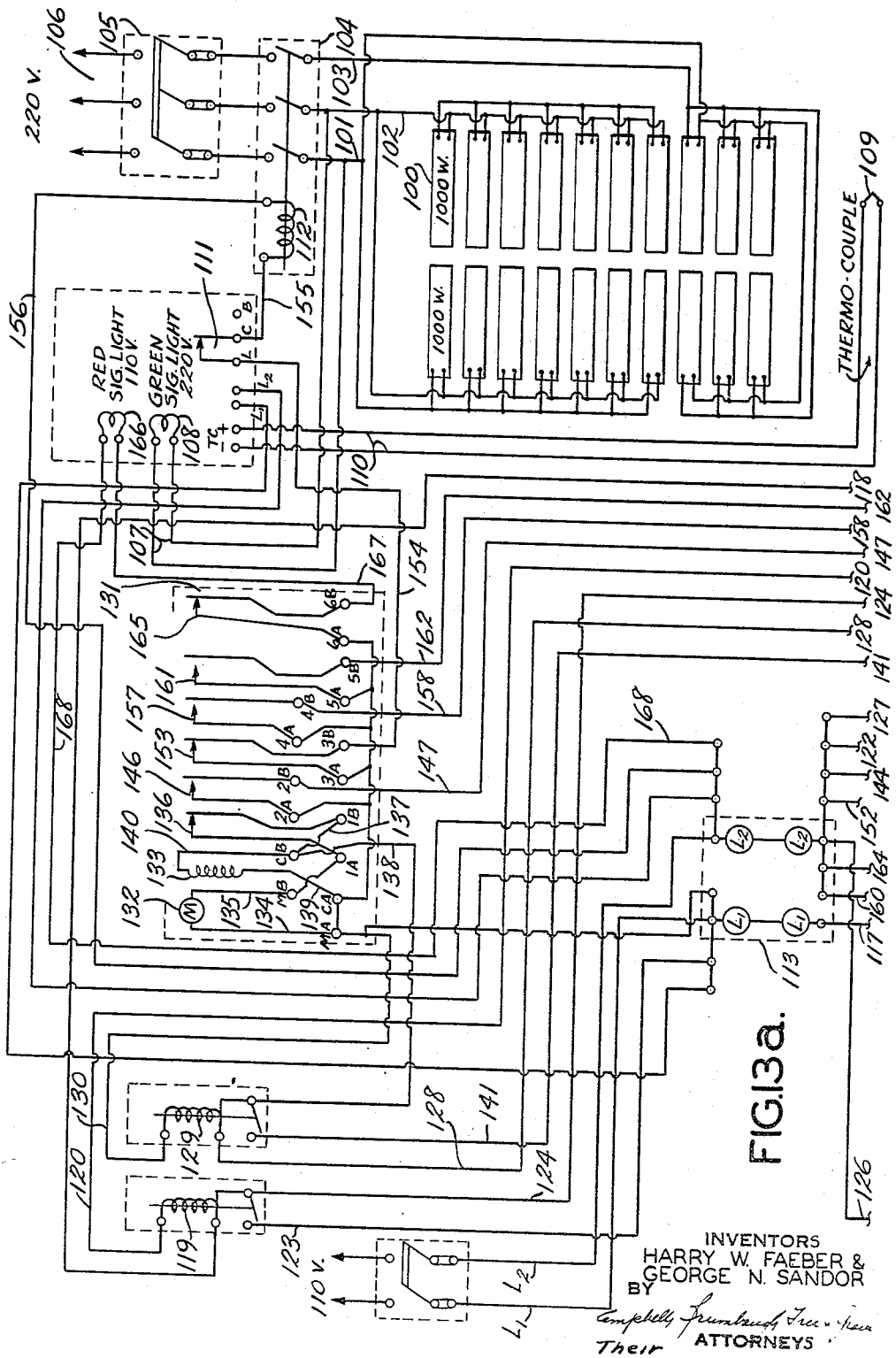

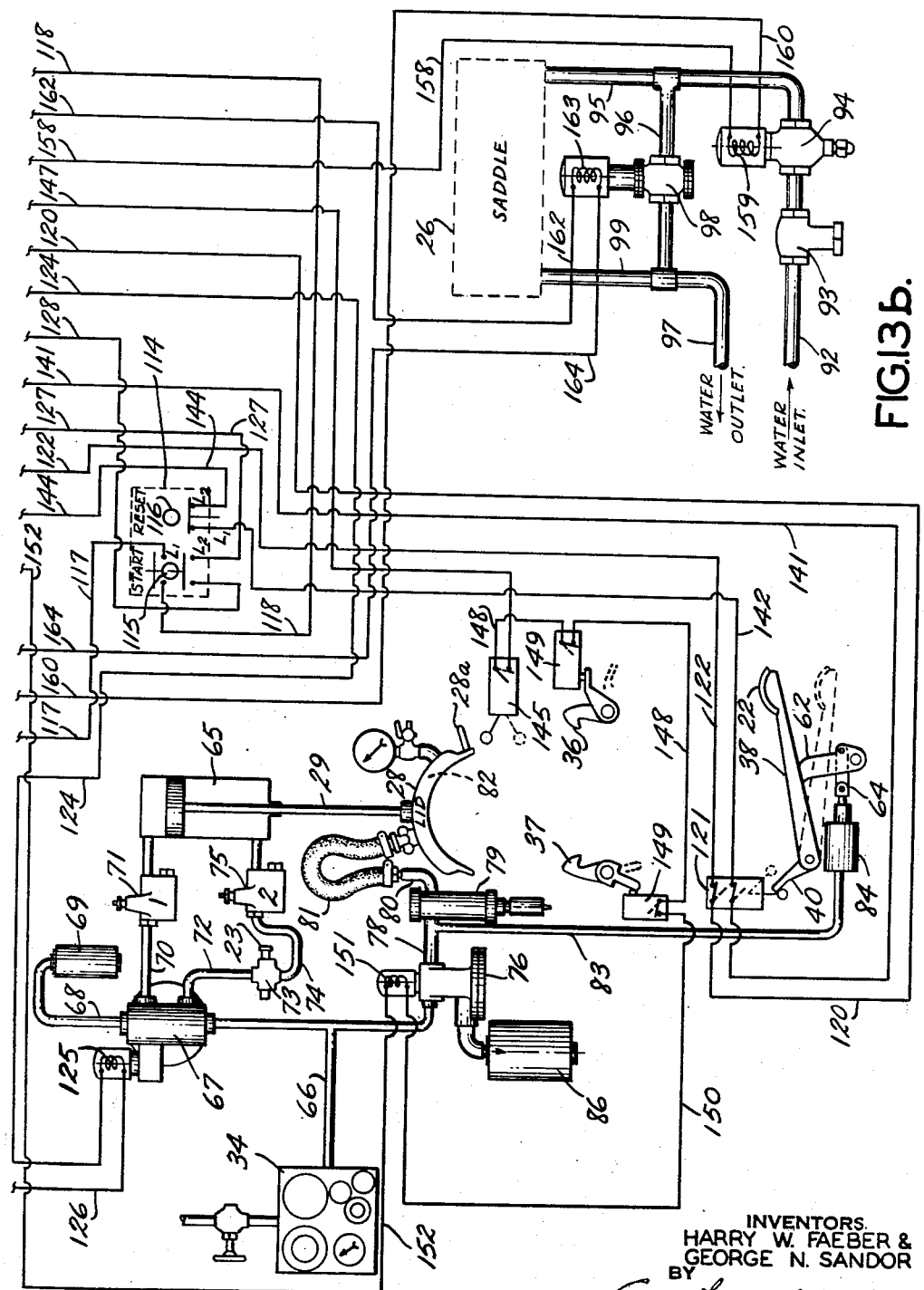

Patented Aug. 17, 1954

2,686,552

UNITED STATES PATENT OFFICE 2,686,552

APPARATUS FOR BONDING LAMINAE OF LAMINATED PRINTING PLATES

Harry W. Faeber, Larchmont, and George N. Sandor, Mamaroneck, N. Y., assignors to Time, Incorporated, New York, N. Y., a corporation of New York Application February 15, 1950, Serial No. 144,336

16 Claims. (Cl. 154—1)

The present invention relates to bonding machines and, more specifically, to machines for bonding together the laminations of printing plates.

In connection with recent developments in the printing art, it has been found that great advantages flow from the use of printing plates having laminations formed in a particular way, and the problem of bonding such laminations effectively has given rise to considerable difficulty. An object of the present invention is to provide a machine by means of which such laminations may be bonded together effectively.

A further object of the present invention is to provide a bonding machine of the above character wherein a predetermined series of operations may be carried out in a desired sequence and timed relationship.

Yet another object of the present invention is to provide a mechanism by means of which operations of the above character may be performed in a desired fashion and in which such operations provide a suitable control over pressure creating mechanism to which the laminations are subjected during the bonding operations, heating mechanism by means of which the bonding is facilitated, and cooling mechanism to perform the final operation upon the assembled and bonded laminations.

Further objects of the present invention will be apparent as it is described in greater detail in connection with the accompanying drawings, wherein Figure 1 is a view in front elevation and somewhat in perspective, showing a machine constructed in accordance with the present invention, and showing the lid in open position;

Figure 8 is a view in front elevation, showing the piping and related mechanisms of Figures 5 and 6;

Figure 9 is a view in longitudinal section, taken on the line 9—9 of Figure 10, and looking in the direction of the arrows;

Figure 10 is a view in transverse section, taken on line 10—10 of Figure 9, and looking in the direction of the arrows;

Figure 11 is an exploded view showing the register pins of Figure 9;

Figures 13a and 13b together form a detailed diagrammatic drawing of the electrical connections for operating the elements of the machine.

Figure 1:
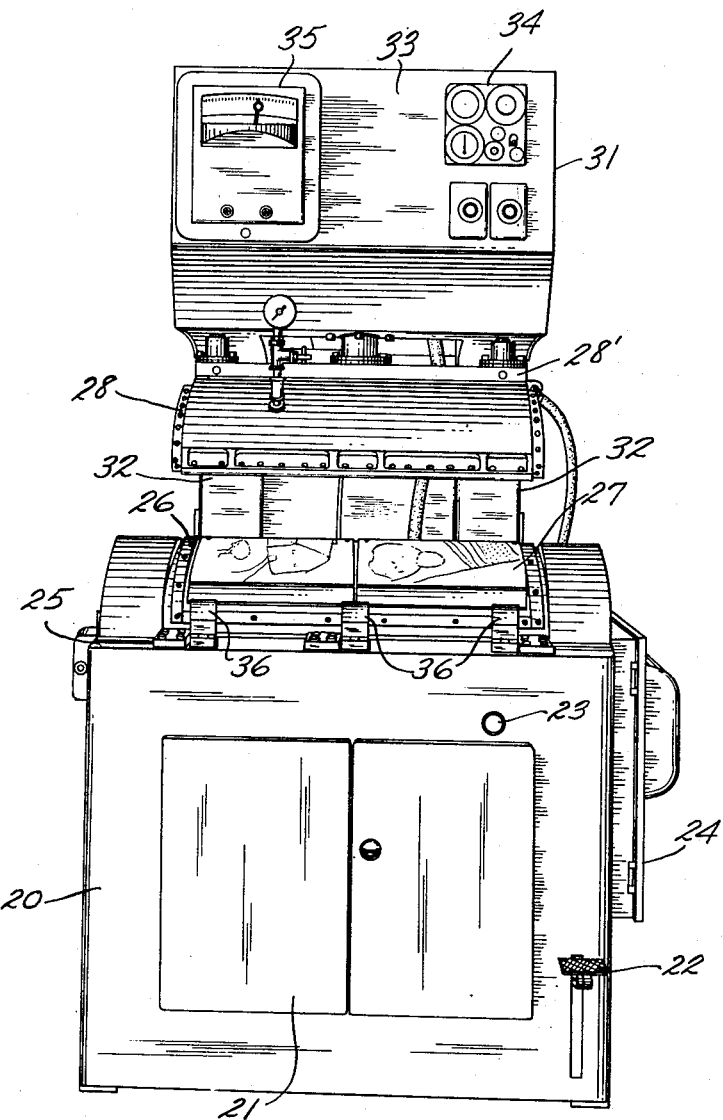

In order that the invention may be more fully understood, it will be explained in a preliminary way that the bonding machine, according to the present invention, is designed to receive laminations which are to form a complete laminated printing plate, such laminations having been curved to a desired configuration. These laminations are received upon a saddle which is adapted to be heated and cooled in accordance with the sequence of operations involved in the bonding of the laminations together. When the plate laminations are placed upon the saddle, a lid next descends over the laminations and subjects them to pressure. In order that all portions of the lamination may be subjected effectively to a desired pressure, the lid is formed with a flexible diaphragm and diaphragm chamber that presses against the laminations in order that all areas of the latter may be subjected to the desired pressure. When the laminations are thus subjected to pressure, the heating mechanism is actuated in order that the bonding material that has been placed between the laminations may be subjected to the desired temperature. After the heat has been applied for the desired length of time, the saddle is cooled by the fluid cooling medium, and the lid of the machine is then raised in order that the completely bonded plate may be removed from the saddle.

The foregoing operations, according to the present invention, involve the use of a fluid under pressure for actuating both the lid and the diaphragm, a cooling fluid to cool the saddle and bonded plate, and electrical circuits and mechanisms by means of which the various devices controlling the flow of fluids, as well as the heating of the saddle, may be accomplished.

Before describing the fluid and electrical mechanisms and connections in detail, the mechanical features of the bonding machine will first be described.

Referring particularly to Figures 1 to 4, inclusive, the base of the machine is illustrated at 20 as being provided with access doors 21, a foot treadle 22, a manually operated valve push button 23, and a suitable control box 24. The top of the base is provided with a table 25 upon which a curved saddle 26 is secured. This saddle will be described in greater detail presently, it being sufficient at this point to state that it is adapted to receive one or more series of laminations as indicated at 27, which laminations are to be bonded permanently together to form a printing plate. The laminations are secured upon the saddle in proper register position by means of register pins 26' that are secured removably in pin cartridges 26'' (see Figure 11) by means of internally threaded nuts 26'''.

Above the saddle 26 a vertically movable lid 28 is provided, the lid being mounted upon a piston rod 29 and side guide rods 30. In order that lids of varying size and conformation may be used on the machine, the connection between the piston and guide rods of the lid includes an inverted channel member 28' within which a mating tongue 28'' is slidably received. Rods 29 and 30 are secured within superstructure 31 that is carried by a rear upright member 32, the front panel 33 of the superstructure being adapted to receive instruments indicated generally at 34 and 35, as required by the fluid and electrical circuits presently to be described.

Figure 2:
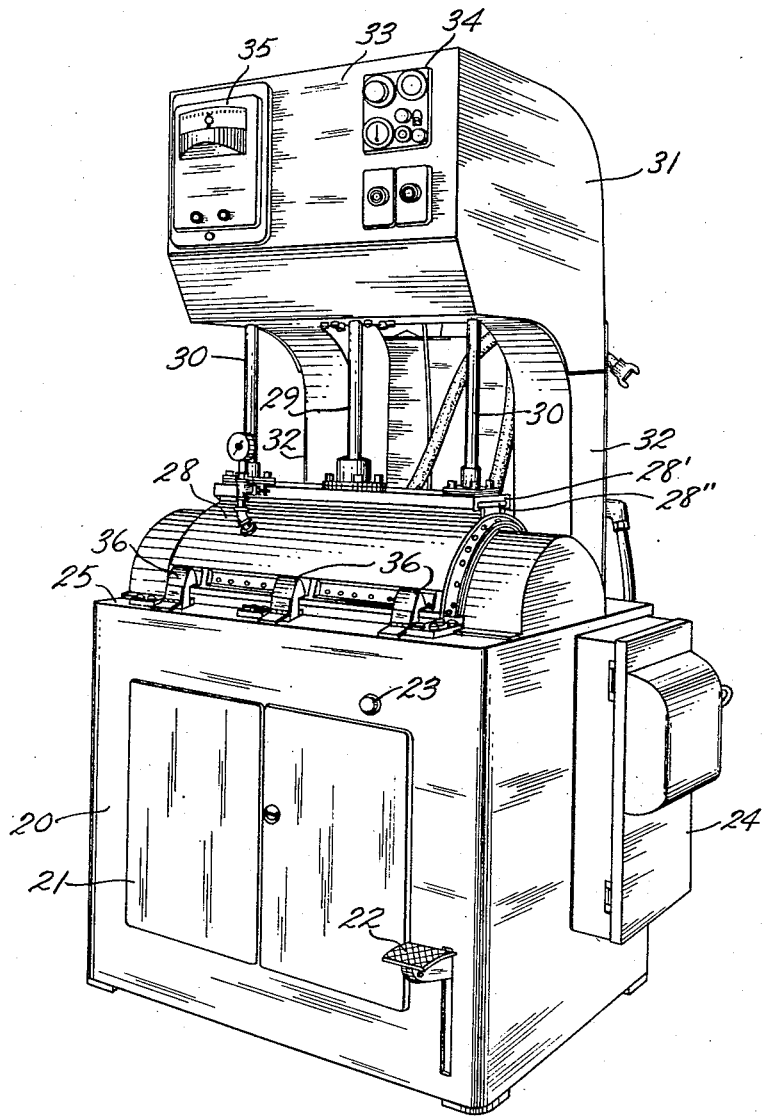
Figure 2 is a view in perspective of the machine of Figure 1, showing the lid in bonding position.
Figure 3:
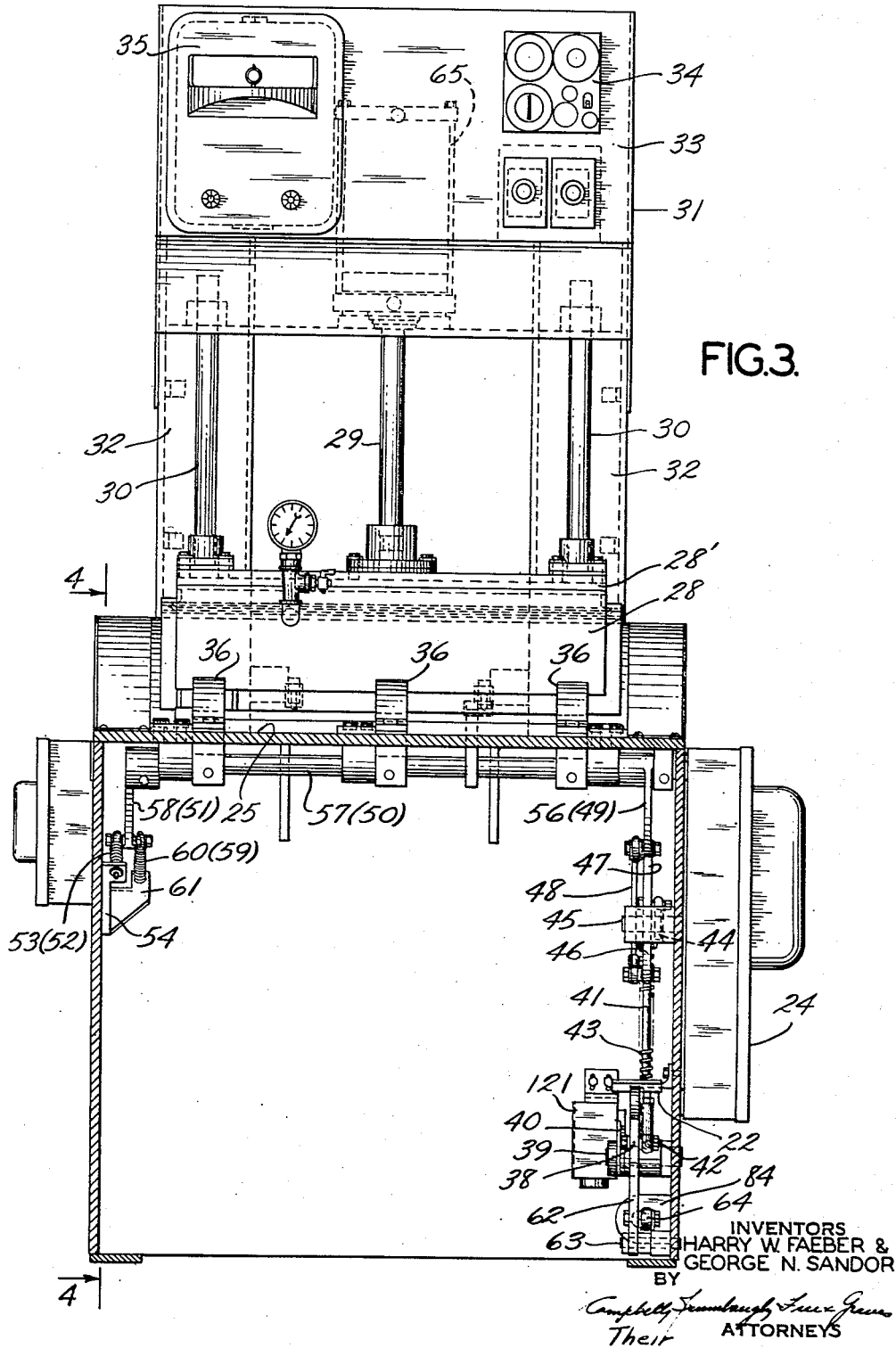
Figure 3 is a view in front elevation of the bonding machine with the lid in closed position, and with a portion of the housing in section to illustrate the latch operating mechanism.
Figure 4:
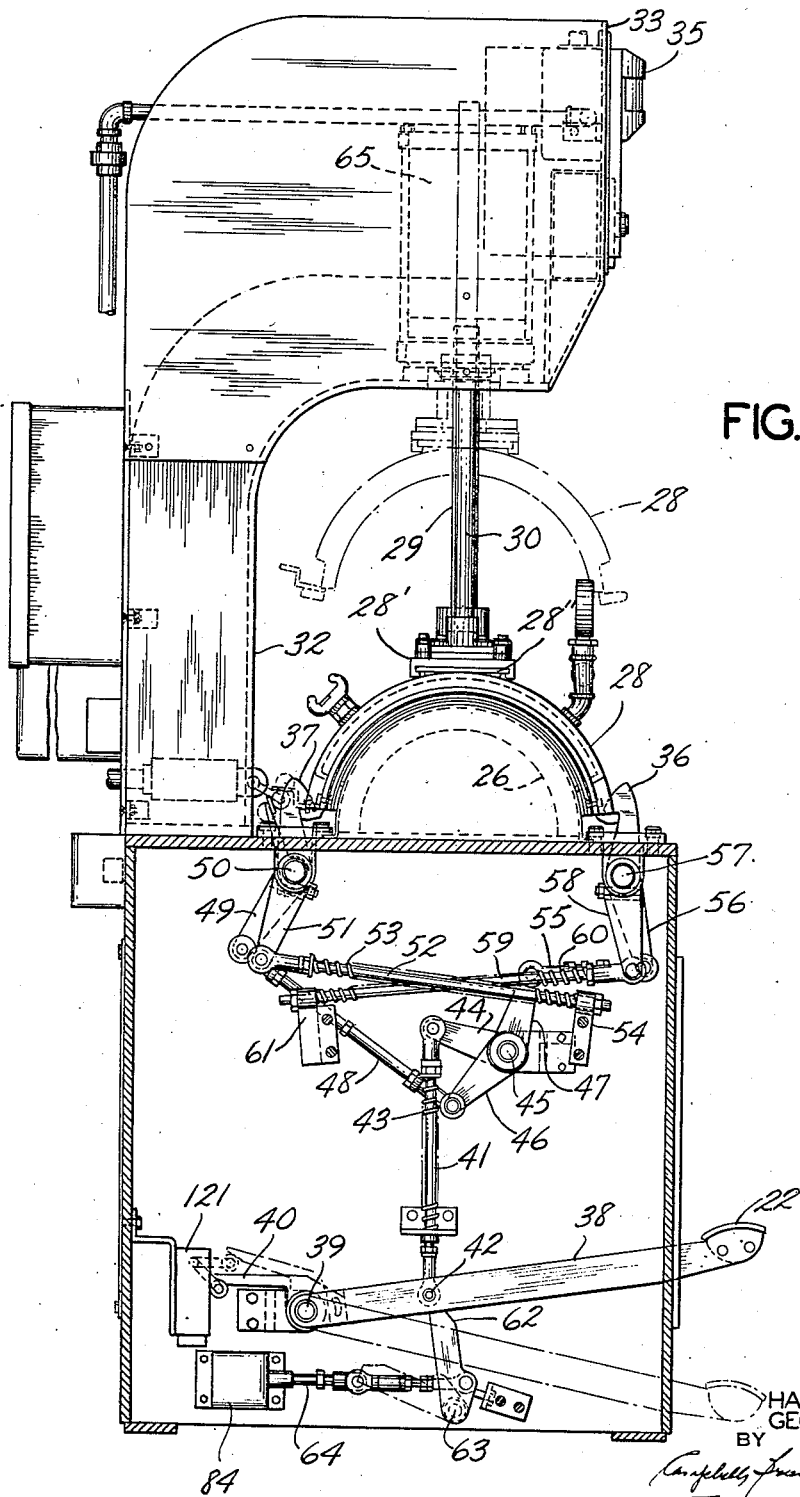
Figure 4 is a view in end elevation, and partly in section, on the line 4—4 of Figure 3 and looking in the direction of the arrows.
Figure 5:
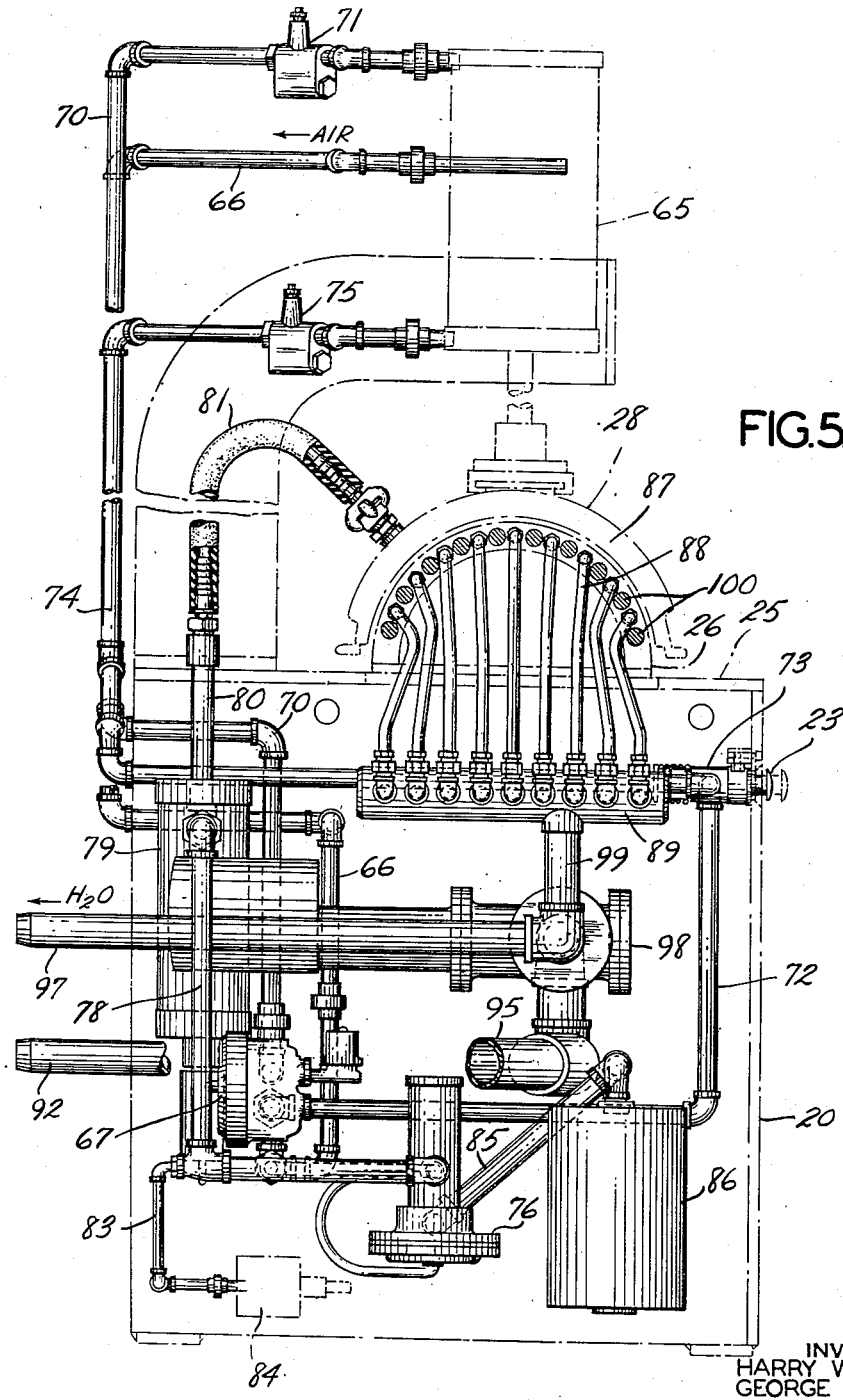
Figure 5 is a view in end elevation showing the air and water pipes and connections for the machine, with the outline of the machine illustrated in skeleton.

The lid 28 is locked in the position illustrated in Figure 2 by means of a plurality of front latches 36 and rear latches 37. These latches are operated by the treadle 22 through the mechanism illustrated in Figure 4. Referring to this view, the treadle 22 is mounted upon an arm 38 that is pivoted at 39 and provided with a limit switch actuating arm 40. The vertically movable link 41 is pivoted at 42 in the arm 38 and is normally urged into position by means of a spring 43. The upper end of the link 41 is pivoted to a crank arm 44 which is keyed to a shaft 45. Crank arms 46 and 47 are likewise keyed to shaft 45 in order that they may turn with the crank arm 44. To the crank arm 46 a link 48 is secured, the other end of which is secured to a crank arm 49, which is keyed to a shaft 50. An additional crank arm 51 is keyed to the shaft 50 and is provided with a guide rod 52 over which a spring 53 is secured. The guide rod is slidably mounted in a bracket 54, this mechanism serving to urge the latches 37 normally into the latching position illustrated in Figure 4.

Crank arm 47 is connected pivotally to a link 55 that is connected pivotally to a crank arm 56 keyed to a shaft 57. Also keyed to shaft 57 are the latches 36 as well as an additional crank arm 58. A guiding rod 59 is pivoted to the end of the crank arm 58 and carries a return spring 60, which is seated against a bracket 61 in which the guide rod is slidable. The spring 60 thus urges the latches 36 into the position illustrated in Figure 4.

When the treadle 22 is depressed, the latches 36 and 37 will be moved simultaneously into their released position through the crank arms and link connections above described. To prevent the treadle 22 from being depressed during a portion of the operating cycle of the machine, a foot treadle stop 62 is provided, being mounted pivotally at 63 to the side wall of the machine and being operated by linkage indicated generally at 64 which, in turn, is actuated by the fluid operated piston and cylinder mechanism presently to be described. The stop 62 is normally urged into its retracted position, shown in dot-and-dash lines in Figure 4, by means of a suitable spring return device.

The specific fluid and electrical mechanisms and connections will now be described.

The fluid pressure mechanism

Figure 6:
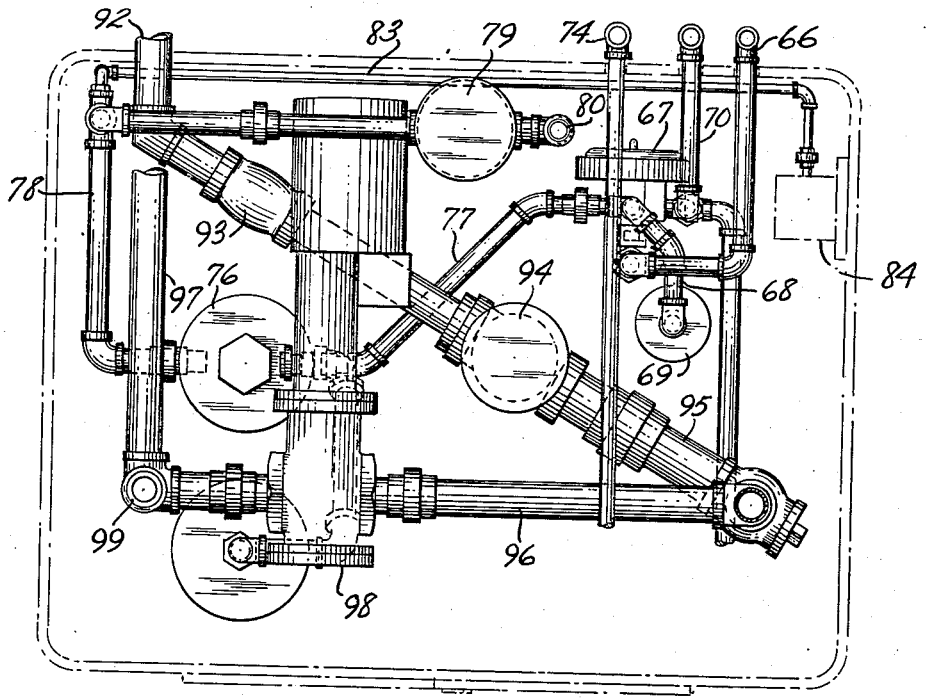
Figure 6 is a plan view of the pipe and other related fluid elements and connections shown in Figure 5.

In order that the lid 28 may be raised and lowered as desired during the operating cycle of the machine, the piston rod 29 is operated by a piston carried within a cylinder indicated in phantom at 65. Air under pressure is utilized to actuate the piston within the cylinder 65, and this air is derived from a suitable source through a pipe 66 that leads the air to a four-way valve 67 of conventional design indicated at 67. From this valve, air is controllably discharged through a discharge pipe 68 and exhaust muffler 69 (Figure 6). The valve 67 also serves to direct air controllably to the top and bottom ports of the cylinder 65 through, respectively, a pipe 70 which furnishes air to the upper cylinder port through a control valve 71. The control valve permits free flow of air into the cylinder, but exerts a control action upon the discharge of air in reverse direction through the pipe 70. Air from the four-way valve 67 to the lower cylinder port is carried through a pipe 72 to a safety valve 73 that is controlled by the manual push button 23 at the front of the machine. From the valve 73 the air is carried on through pipe 74 and the control valve 75 to the bottom port of the cylinder 65. The four-way valve 67 is operated electromagnetically in a manner presently to be described, causing the air under pressure selectively to be directed to the top or bottom of the cylinder and to the exhaust muffler 69, as above described.

Figure 7:
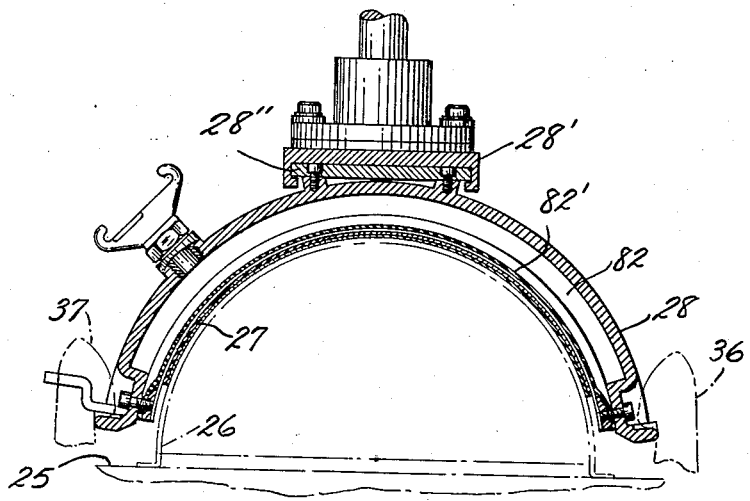
Figure 7 is a partial view, in section, showing the structure of the lid.

Air also flows from the inlet pipe 66 to a three-way valve 76 (of conventional design) through a pipe 77. This three-way valve is operated electromagnetically in a manner presently to be described, to direct the air through a pipe 78 and air separator 79 of conventional design to a pipe 80 and flexible hose connection 81, which directs the air into the air chamber 82 (Figure 7) of the lid 28. A flexible diaphragm 82' is secured to the lid 28 in order to make an airtight connection therewith and to complete the enclosure of the air chamber 82. During the bonding operation, this diaphragm 82' is forced against the laminations 27 carried by the saddle 26 to furnish the desired pressure to accomplish the bonding operation. Air from the pipe 78 is also carried through a pipe 83 to a cylinder 84 containing a piston that actuates the foot treadle stop linkage 64. The three-way valve 76 is also connected to a pipe 85 and exhaust muffler 86 in order that the lid chamber 82 may be selectively connected to the source of air under pressure and to the exhaust muffler 86.

From the foregoing it will be seen that the lid 28 is raised and lowered by the selective actuation of the four-way valve 67 in order that air may be directed to either the top or bottom of the cylinder and in order that the end of the cylinder to which the air is not directed may be connected to an exhaust mechanism. The three-way valve 76 serves to direct air under pressure to the air chamber 82 of the lid 28, so that this may be accomplished when the lid is lowered upon the laminations to be bonded that are positioned upon the saddle 26, the valve 76 also serving to exhaust the air under pressure from the chamber 82 through the exhaust muffler 86 after the bonding operation has been completed. As will be presently described, the foot treadle stop actuating mechanism serves as a means to prevent the raising of the lid while the air within the lid chamber 82 is under pressure.

The fluid cooling system

In order that the saddle 26 may be cooled at the end of the bonding cycle, a water cooling system is provided, including a plurality of cooling ducts 87 (Figures 9 and 10), each of which is connected, at one end, through a pipe 88 to a water manifold 89 and, at the other end, through a pipe 90 to a water manifold 91.

Water is furnished to the machine through a supply pipe 92 and strainer 93 to a water valve 94. This water valve is operated electromagnetically in a manner that will be described presently, the valve being connected to a water supply pipe 95 which furnishes water to the manifold 91. A second pipe 96, connected to pipe 95, furnishes a connection from such pipe to a drain pipe 97 by means of an electromagnetically operated valve 98. The drain pipe 97 is also connected to the water manifold 89 by means of a pipe connection 99.

By suitably controlling the valves 94 and 98, water may be caused to flow from the inlet pipe 92 through the manifold 91, through the pipe connections 90, and ducts 87 to the pipe connections 88 and water manifold 89. From the manifold 89, the water flows to the drain pipe 97 through the pipe connection 99. When the cooling cycle is ended, it is essential that all of the water be drained from the saddle and pipe connections. To accomplish this, the water valve 94 is closed and the drain valve 98 opened. This causes the water in the saddle, pipe connections 88 and 90, and manifolds 89 and 91 to discharge into the drain pipe 97 through, respectively, the pipe connection 99 and the pipe sections 95 and 96, and drain valve 98. The electrical connections for accomplishing this operation will now be described.

The electrical circuits

Figure 12:
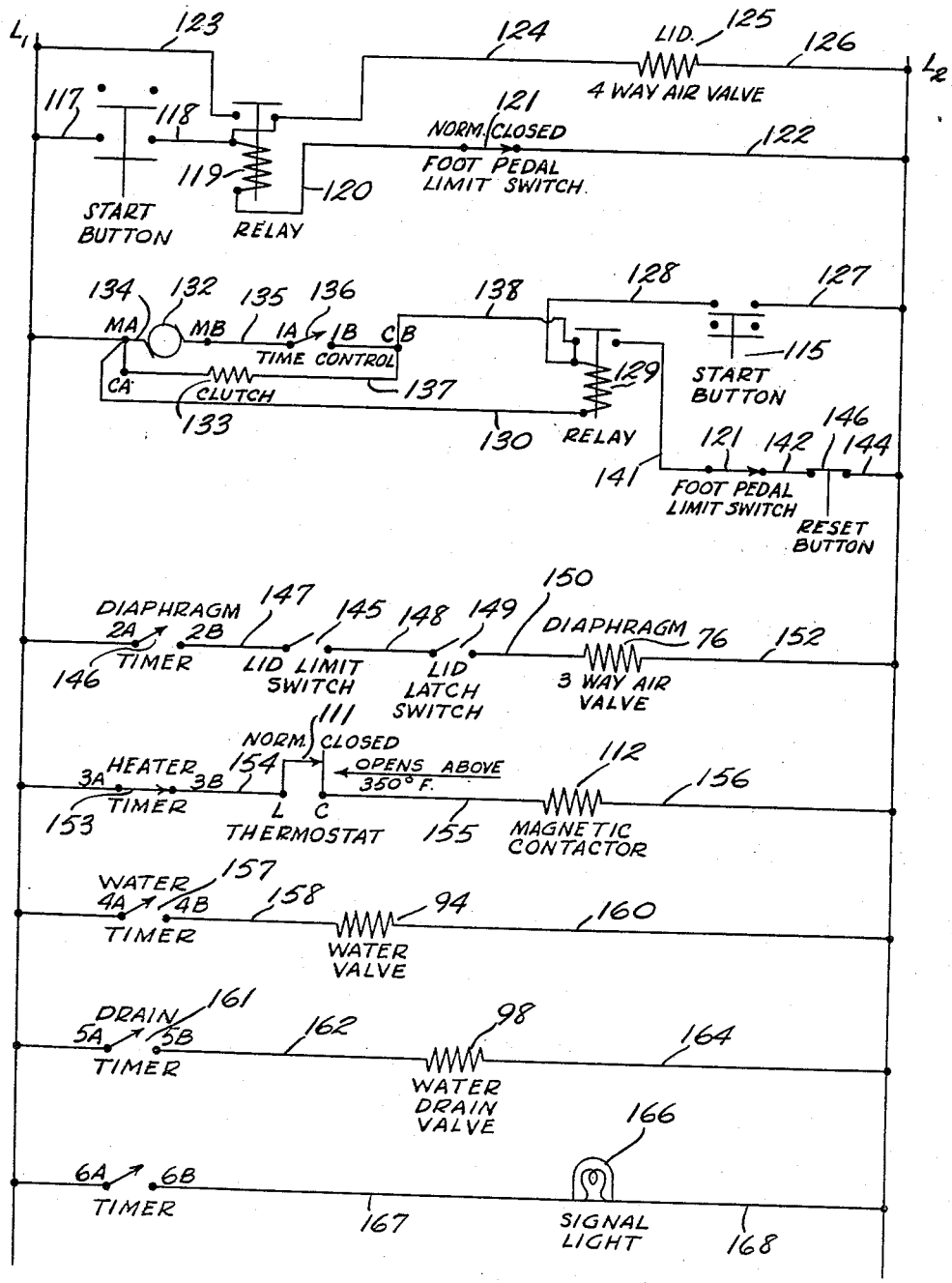
Figure 12 is an across-the-line diagrammatic drawing of the electrical connections utilized in the bonding machine of the present invention.

In order to complete the bonding operation, the saddle 26 is heated by a plurality of high resistance electrical heaters 100. These heaters are spaced alternately between the cooling ducts 87, as illustrated in Figure 10, and are shown diagrammatically in Figure 13a. These heaters are shown in Figure 13a as being connected in parallel in three groups across the three wires 101, 102, and 103 of a three-phase 220-volt circuit, which is connected through a magnetic contactor 104 and line switch 105 to a power supply 106. Circuit wires 107 connect a green signal light 108 across the wires 101, 102 in order to furnish an indication of the fact that the heater elements are connected to the source of power. A thermo-couple 109 is connected through wires 110 to a conventional mechanism for actuating a contactor 111 upon the attainment of a predetermined maximum temperature within the saddle 26. In this fashion when the predetermined temperature is reached, the contactor 104 is actuated to disconnect the wires 101, 102 and 103 from the power source 106. The manner in which this is accomplished is by deenergization of the relay coil 112 of the contactor 104. Reference to Figure 12, as well as Figures 13a and 13b, will illustrate the control circuits not only for energizing the magnetic contactor 104, but for operating the various control mechanisms essential to the operations above mentioned.

In these circuits the power supply for the mechanism is illustrated by the wires $L_1$ and $L_2$ which are connected, respectively, to certain of the terminals of a terminal block 113, as illustrated in Figure 13a. A starting switch is shown at 114 as including not only a starting button 115, but a re-set button 116. The starting button closes its upper contacts, one of which is connected to the line $L_1$ by means of a connection 117. The other upper contact is connected through a line 118 to the coil 119 of a relay, the other terminal of which coil is connected through a wire 120 to the upper contacts of a limit switch 121 that is actuated by the arm 40 carried by the treadle arm 38. The upper contacts of limit switch 121 are also connected through a wire 122 to the line $L_2$. It is to be observed that the limit switch 121 is normally closed when the treadle is in the upper position, and when the treadle is depressed, the limit switch is open. In this fashion the coil 119 is energized, closing its contacts, one of which is connected through a wire 123 to the line $L_1$, and the other of which is connected through a wire 124 to the coil 125 of the magnet for actuating the four-way valve 67. The other terminal of the coil 125 is connected through a wire 126 to the line $L_2$. In this fashion the valve 67 is actuated to direct air under pressure into the top of the cylinder 65 and to cause the bottom of the cylinder to be connected to the exhaust muffler 69.

The lower contacts of the starting switch are connected to the line $L_2$ by means of a wire 127 and, through a wire 128 to the coil 129 of a second guardian relay, which coil is connected through a wire 130 to the power line $L_1$. Thus the contacts of the second relay are closed causing a timing mechanism 131 to be actuated. This timing mechanism is of conventional form now commercially available on the market, and includes a motor 132 and clutch coil 133. The clutch coil serves to connect the motor to a cam plate that is moved during the timing operation to cause the various timer contacts to be actuated in a desired sequence. The details of this mechanism will not be described because they form no part of the invention, it being sufficiently understood merely to state that the contacts are adjustable so that the phase relationship of the operation of the various contacts may be desirably adjusted. Thus, when the second relay coil is energized, its contacts close a circuit which extends from the line $L_1$ through a wire 134 to the motor 132, wire 135 and time control contact 136, wires 137 and 138 to the contacts of the second relay. The circuit also includes in parallel the clutch coil 133 through wires 139 and 140. From the contacts of the second relay, the circuit continues through a wire 141 to the lower contacts of the limit switch 121, then through wire 142, the contacts of re-set switch 116 and wire 144 to the line $L_2$. This last described circuit thus sets in operation the timing mechanism, and the cycle of operation is initiated.

As above described, the lid 28 descends and, by means of an arm 29a, closes a limit switch 145. Thus, when the timer closes its diaphragm contacts 146, current will flow from the line $L_1$ through the contacts 146 and wire 147, contacts of limit switch 145 and wire 148, contacts of switches 149 and wire 150, to the coil 151 for actuating the three-way valve 76, and then finally through a wire 152 to the circuit L2. It is to be observed that the switches 149 are closed when the latches 36 and 37 are in their lid-latching position, and that the foregoing circuit, when energized, causes the three-way valve 76 to direct air under pressure into the chamber 82 of the lid 28, thus causing the laminations that have been placed upon the saddle to be pressed together to a desired extent.

Continued operation of the timer 131 causes its heater contacts 153 to be closed, thus completing a circuit from the line L2 through such contacts and through a wire 154, normally closed contacts 111, wire 155, and the magnetic contactor coil 112 to a wire 156 which is connected to the circuit wire L2. In this fashion the magnetic contactor 104 is actuated to connect the heater elements across the power supply 106, as previously described. Heat is thus generated in the saddle, and the bonding operation begins.

As the timer continues its movement, the water contacts 157 are closed, establishing a connection from the power line L1 through such contacts and through wire 158 to the coil 159 of the water valve 94. This coil is connected to the line L2 through a wire 160. The contact 157 is closed simultaneously with the opening of the heater contact 153 and, as a result, cooling water flows through the lid in the manner hereinabove described to effect the desired cooling operation. The timer 131 next closes its drain contacts 161 simultaneously with the opening of its water contacts 157, thus establishing an electrical circuit from the wire L1 and drain contacts 161 through a wire 162 to the coil 163 of the drain valve 98, and from thence through a wire 164 to the line L2. The opening of the drain valve thus causes the saddle and pipe connections to be drained in the manner previously described. The timer 131 then opens the drain contacts 161 and closes its signal contacts 165 to illuminate a red signal light 166 in the control box. This is accomplished through a wire 167 and 168, the latter of which is connected to the power supply wire L2. Simultaneously with the lighting of the red signal light, the timer diaphragm contact 146 opens, causing the circuit through the coil of the three-way valve 76 to be opened. This connects the chamber 82 with the exhaust muffler 85, thus discharging the air above the diaphragm of the lid and causing the treadle stop to be moved into its retracted position.

When the red signal light appears, the operator depresses the foot treadle 22, causing the limit switch 121 to be opened and breaking the circuit of the coil 119. When the contacts of the first relay open, the coil of the four-way valve 67 is deenergized, and the valve moves to connect the top of the cylinder 65 with the exhaust muffler 69. Simultaneously, the bottom of the cylinder 65 is connected with the source of air under pressure and, as a result, the lid 28 rises into the position illustrated in Figure 1. The bottom contacts of the foot treadle-operated switch 121 also open the circuit to the coil 129 of the second relay, thus opening the timer motor and clutch circuits and causing the timer cam plate to close the time control contacts 136 preparatory to the starting of a new cycle of operations.

From the foregoing it will be seen that a mechanism has been provided by means of which a bonding operation may be carried out effectively to bond together the laminations of a printing plate, such operations including the application of a desired pressure to the plate, simultaneously with subjecting the plate laminations to a desired temperature, following which the plate is cooled and the pressure relieved.

While the invention has been described with specific reference to the accompanying drawings, it is not to be limited save as defined in the appended claims.

We claim:

1. In an apparatus for bonding the laminations of printing plates, comprising a curved saddle for supporting a plurality of plate laminations, a lid for the saddle, a flexible diaphragm secured to the lid to form a fluid-tight chamber, and means to introduce a fluid under pressure into the chamber; the combination therewith of electrically actuated valve means to control the introduction of fluid into the chamber, a fluid pressure actuated motor to move the lid toward and away from said saddle, electrically actuated valve means to control the operation of said motor, and electrically controlled timing mechanism to actuate the motor control valve means and the fluid introduction control valve means in sequence.

2. In an apparatus for bonding the laminations of printing plates, comprising a curved saddle for supporting a plurality of plate laminations, a lid for the saddle, a flexible diaphragm secured to the lid to form a fluid-tight chamber, and means to introduce a fluid under pressure into the chamber to apply pressure to said laminations; the combination therewith of electrically actuated valve means to control the introduction of fluid into the chamber, a fluid pressure actuated motor to move the lid toward and away from said saddle, electrically actuated valve means to control the operation of said motor, a manually actuated starting switch, electrically controlled timing valve means to actuate the motor control mechanism and the fluid introduction control valve means in sequence, and means energized by the starting switch to initiate operation of said timing mechanism.

3. In an apparatus for bonding the laminations of printing plates, comprising a curved saddle for supporting a plurality of plate laminations, a lid for the saddle, a flexible diaphragm secured to the lid to form a fluid-tight chamber, and means to introduce a fluid under pressure into the chamber; the combination therewith of electrically actuated valve means to control the introduction of fluid into the chamber, a motor to move the lid toward and away from said saddle, electrically actuated mechanism and circuits to control the operation of said motor, electrical heating means to heat the saddle, switch means to control the heating means, a manually actuated starting switch, electrically controlled timing mechanism to actuate the motor control mechanism, the fluid introduction control valve means and the switch means in sequence, and means energized by the starting switch to initiate operation of the timing mechanism.

4. In an apparatus for bonding the laminations of printing plates, comprising a curved saddle for supporting a plurality of plate laminations, a lid for the saddle, a flexible diaphragm secured to the lid to form a fluid-tight chamber, and means to introduce a fluid under pressure into the chamber; the combination therewith of electrically actuated valve means to control the introduction of fluid into the chamber, a motor to move the lid to operative and inoperative positions, electrically actuated mechanism to control the operation of said motor, electrical means to heat the saddle, switch means to control the heating means, fluid cooling means to cool the saddle, electrically controlled valve means to control the cooling means, a manually actuated starting switch, electrically controlled timing mechanism to actuate the motor control mechanism, the fluid introduction control valve means the switch means and the valve means to control said cooling means in sequence, and means energized by the starting switch to initiate operation of the timing mechanism.

5. In an apparatus for bonding the laminations of printing plates, comprising a curved saddle for supporting a plurality of plate laminations, a lid for the saddle, a flexible diaphragm secured to the lid to form a fluid-tight chamber, and means to introduce a fluid under pressure into the chamber; the combination therewith of electrically actuated mechanism to control the introduction of fluid into the chamber, means to move the lid to operative and inoperative positions, electrically actuated mechanism to control the operation of the lid moving means, means to heat the saddle, electrically controlled means to actuate the heating means, means forming a water cooling circuit within the saddle, electrically actuated means to control the cooling means, a manually actuated starting switch, electrically controlled timing mechanism to actuate the lid control mechanism, the fluid introduction control means, the heat actuating means and the cooling means in sequence, and means responsive to the operation of the starting switch to initiate operation of the timing mechanism.

6. In an apparatus for bonding the laminations of printing plates, comprising a curved saddle for supporting a plurality of plate laminations, a curved lid for the saddle, a flexible diaphragm secured to the lid to form a fluid-tight chamber, and means to introduce a fluid under pressure into the chamber; the combination therewith of electrically actuated mechanism and circuits to control the introduction of fluid into the chamber, means to move the lid to operative and inoperative positions, electrically actuated mechanism and circuits to control the operation of the lid moving means, means to heat the saddle, electrically controlled means and circuits to actuate the heating means, means forming a water cooling circuit within the saddle, electrically controlled means including a valve and circuits to actuate the cooling means, means to drain the saddle, electrically controlled means and circuits to actuate the drain means, a manually actuated starting switch connected in the electrical circuits, electrically controlled timing mechanism to actuate the lid control mechanism, the fluid introduction control means, the heat actuating means, the cooling means and the drain in sequence, and means energized by the starting switch to initiate operation of the timing mechanism.

7. In an apparatus for bonding the laminations of printing plates, comprising a curved saddle for supporting a plurality of plate laminations, a lid for the saddle, and a flexible diaphragm secured to the lid to form a fluid-tight chamber; the combination therewith of electrically controlled means to introduce a fluid under pressure into and discharge it from the the chamber, electrically controlled means to move the lid to operative and inoperative positions, means to heat the saddle, electrically actuated means to control the heating means, means forming a water cooling circuit within the saddle, electrically controlled valve means to actuate the cooling means, electrically actuated means to drain the saddle, a manually actuated starting switch, a timing mechanism electrically connected to said fluid introducing and discharging means, the heat controlling means, the cooling means and the drain to actuate them in sequence, signal means, means actuated by the timing mechanism to actuate the signal means after actuation of the drain means, and means controlled by the starting switch to initiate operation of the timing mechanism.

8. In an apparatus for bonding the laminations of printing plates, comprising a curved saddle for supporting a plurality of plate laminations, a curved lid for the saddle, a flexible diaphragm secured to the lid to form a fluid-tight chamber, and means to introduce a fluid under pressure into the chamber; the combination therewith of electrically actuated mechanism and circuits to control the introduction of fluid into the chamber, means to move the lid to operative and inoperative positions, electrically actuated mechanism and circuits to control the operation of the lid moving means, means to heat the saddle, electrically controlled means and circuits to actuate the heating means, means forming a water cooling circuit within the saddle, electrically controlled means and circuits to actuate the cooling means, means to drain the saddle, electrically controlled means and circuits to actuate the drain, a manually actuated starting switch connected in the electrical circuits, electrically controlled timing mechanism to actuate the lid control mechanism, the fluid introduction control means, the heat actuating means, the cooling means and the drain in sequence, signal means, means actuated by the timing mechanism to actuate the signal means after actuation of the drain, lock mechanism to secure the lid in operative position, manually actuated means to release the lock mechanism, and means energized by the starting switch to operate the timing mechanism.

9. In an apparatus for bonding laminations of printing plates, comprising a saddle for supporting a plurality of plate laminations, a lid for said saddle, a flexible diaphragm secured to said lid to form a fluid-tight chamber, means to introduce fluid into and discharge it from said chamber, means to move said lid toward said saddle into an operative position in which said diaphragm can engage the laminations supported on said saddle, and away from said saddle to an inoperative position, and a locking member engageable with said lid to retain it in said operative position; the combination therewith of a manually operated member connected to said locking member to disengage it from and release said lid, means to render said manually operated member effective and ineffective to disengage said locking member from said lid and operating connections between said fluid introducing means and the means for rendering said locking members effective and ineffective, to actuate the last-mentioned means and render the manually operated member ineffective when fluid under pressure is introduced into said chamber and to actuate the last-mentioned means to render the manually operated member effective to release said locking member when fluid is discharged from said chamber.

10. In an apparatus for bonding laminations of printing plates, comprising a saddle for supporting a plurality of plate laminations, a lid for said saddle, a flexible diaphragm secured to said lid to form a fluid-tight chamber, means to introduce fluid into and discharge it from said chamber, means to move said lid toward said saddle into an operative position in which said diaphragm can engage the laminations supported on said saddle, and away from said saddle to an inoperative position, a locking member engageable with said lid to retain it in said operative position, and a manually operated member connected to said locking member to disengage it from and release said lid; the combination therewith of a blocking member movable into engagement with said manually operated member to render it ineffective to release said locking member, said blocking member being movable, also, out of engagement with said manually operated member to render it effective to release said locking member, and power actuated means connected to said fluid introducing and discharging means to move said blocking member into engagement with said manually operated member when fluid under pressure is introduced into said chamber, and out of engagement with said manually operated member when fluid is discharged from said chamber.

11. The apparatus set forth in claim 10 in which the power actuated means comprises a fluid actuated motor connected to said chamber and responsive to the pressure therein.

12. In an apparatus for bonding the laminations of printing plates, comprising a curved saddle for supporting a plurality of plate laminations, a curved lid for the saddle, a flexible diaphragm secured to the lid to form a fluid-tight chamber, means to introduce a fluid under pressure into the chamber means to move the lid to operative and inoperative positions, and means to lock the lid in its operative position; the combination therewith of a retaining member movable from a first position retaining said lid locking means in locking relation to said lid to another position freeing said locking means to unlock said lid, and an actuating mechanism for moving said retaining member between said first and second positions, said actuating mechanism being responsive to the pressure of the fluid in said chamber to move said retaining member to said first position when the chamber contains fluid under pressure.

13. In an apparatus for bonding the laminations of printing plates, comprising a saddle for supporting a plurality of plate laminations, a lid for the saddle, a flexible diaphragm secured to the lid to form a fluid-tight chamber, means to introduce a fluid under pressure into the chamber, and means to move the lid to operative and inoperative positions; the combination therewith of electrically actuated mechanism to control the operation of the lid moving means, a manually releasable lock mechanism to lock the lid in operative position, a movable member to retain said lock mecheanism in lid locking position, said movable member being normally in another position to free said locking mechanism for manual release, and an actuating mechanism responsive to introduction of fluid under pressure into said chamber to move said movable member to the position retaining said lock mechanism in lid locking position.

14. In an apparatus for bonding the laminations of printing plates, comprising a curved saddle for supporting a plurality of plate laminations, a curved lid for the saddle, a flexible diaphragm secured to the lid to form a fluid-tight chamber, means to introduce a fluid under pressure into and discharge it from the chamber, and means to move the lid to operative and inoperative positions; the combination therewith of a lock to retain the lid in its operative position, means to release the lock, and a control member actuated by the lock release means to disconnect said motor from said source of power and prevent movement of the lid into its operative position while the lock release means is being actuated to move the lock to an unlocked position.

15. In an apparatus for bonding the laminations of printing plates, comprising a curved saddle for supporting a plurality of plate laminations, a curved lid for the saddle, a flexible diaphragm secured to the lid to form a fluid-tight chamber, means including a control valve to introduce a fluid under pressure into and discharge it from the chamber, means to move the lid to operative and inoperative positions and means to lock the lid in its operative position, the combination therewith of a manually actuated member connected with said locking means and movable to lock and unlock said lid, a control member connected to said manually actuated member and movable by the latter to operate said control valve to discharge fluid from said chamber upon movement of the manually actuated member to unlock said lid.

16. In an apparatus for bonding the laminations of printing plates, comprising a curved saddle for supporting a plurality of plate laminations, a lid for the saddle, a flexible diaphragm secured to the lid to form a fluid-tight chamber, means including a control valve to introduce a fluid under pressure into and discharge it from the chamber, means to move the lid to operative and inoperative positions, and means to lock the lid in its operative position, the combination therewith of a control member connected with said control valve for actuating it to admit fluid into said chamber and for actuating it to discharge fluid from said chamber, and means movable with said lid for operating said control member to actuate said control valve to discharge fluid from said chamber when said lid is out of operative position.

References Cited in the file of this patent

UNITED STATES PATENTS

| Number | Name | Date |
|---|---|---|
| 2,138,620 | Strange | Nov. 29, 1938 |
| 2,337,250 | Klassen | Dec. 21, 1943 |
| 2,344,826 | Gresley | Mar. 21, 1944 |
| 2,363,431 | Moorhouse | Nov. 21, 1944 |
| 2,367,779 | Hull | Jan. 23, 1945 |
| 2,382,985 | Fitzgerald | Aug. 21, 1945 |
| 2,385,083 | Kemerer | Sept. 18, 1945 |
| 2,399,327 | Cullen | Apr. 30, 1946 |
| 2,410,857 | Ahern | Nov. 12, 1946 |
| 2,422,979 | Pecker | June 24, 1947 |
| 2,422,999 | Bagley | June 24, 1947 |
| 2,427,300 | Oliver | Sept. 9, 1947 |
| 2,524,932 | Schulman | Oct. 10, 1950 |